June 10, 1930.  E. M. WRIGHT  1,762,373
LUBRICATING DEVICE
Filed Sept. 2, 1927
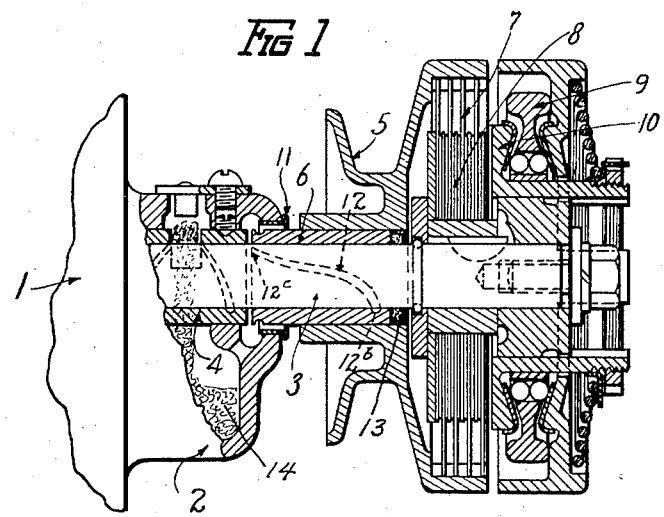
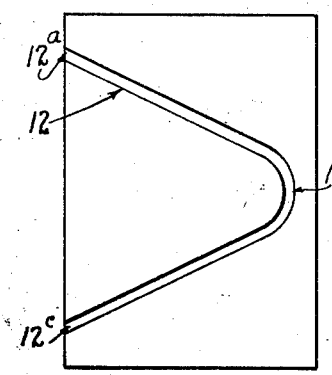
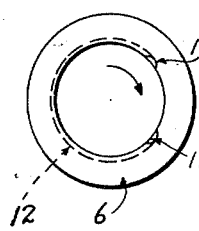
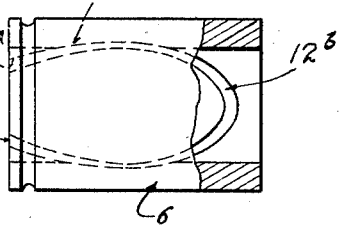
Inventor
Edwin M. Wright
By
Staley + Welch
Attorneys Patented June 10, 1930

1,762,373

UNITED STATES PATENT OFFICE

EDWIN M. WRIGHT, OF SPRINGFIELD, OHIO, ASSIGNOR, BY MESNE ASSIGNMENTS, TO ROBBINS & MYERS, INC., OF SPRINGFIELD, OHIO, A CORPORATION OF OHIO

LUBRICATING DEVICE

Application filed September 2, 1927. Serial No. 217,270.

This invention relates to lubricating means, it more particularly relating to means for lubricating relatively rotatable members from the bearing housing of one of said members.

The object of the invention is to provide a lubricating means of this character which will be simple in construction and effective for the purpose.

In the accompanying drawings:

Fig. 1 is a longitudinal section of a portion of an electric motor and a member driven thereby showing my improved lubricating means applied thereto.

Fig. 2 is a detail of the bushing of the driven member.

Fig. 3 is an end view of the bushing.

Fig. 4 is a diagrammatic view of the bushing showing the same as it would appear if projected in a flat plane.

I have shown my invention applied to an electric motor and a member driven thereby, although the invention is equally applicable to other structures.

Referring to the drawings, 1 represents a portion of the casing of an electric motor, 2 the bearing housing, 3 the shaft of the motor, and 4 a bearing sleeve located in the housing, the housing being constructed to contain a supply of lubricating oil. The shaft is extended beyond the housing and in the present case there is shown loosely mounted upon the shaft a driven member in the form of a pulley 5 having a bushing 6. A plurality of disks, a portion of which 7 are connected with the pulley and a portion 8 connected with the shaft form a multiple disk clutch for connecting the shaft and pulley at a predetermined speed of the shaft; centrifugal weights 9 acting upon an axially movable member 10 being employed to press the disks into driving relation with each other in a manner more fully described in my application Serial No. 217,269, filed Sept. 2, 1927, now patent No. 1,714,748.

To lubricate the bearing for the pulley, the opening in the end of the housing through which the shaft extends is enlarged and the bushing 6 is extended beyond the hub of the pulley and into this opening in proximity to but spaced apart from the end of the bearing sleeve 4, the space between the bushing 6 and the wall of the housing opening being closed by suitable closure 11. Formed in the inner wall of the bushing is a groove 12 which starts at a point coincident with the end of the bushing, as indicated at $12^a$, extends on a line at an angle to the longitudinal axis of the bushing to a point near the outer end of the bushing, is then provided with a return bend, as indicated at $12^b$, and then extends at an inclination to the longitudinal axis of the bushing to another point coincident with the inner end of the bushing as indicated at $12^c$. A packing ring 13 is inserted at the outer end of the bushing 6.

In operation, oil is carried by the wick 14 from the reservoir in the bottom of the housing 2 to the motor shaft which finds its way between the shaft and bearing sleeve 4 to the space between the sleeve and bushing 6. When the pulley is idle with the shaft revolving, oil will be carried with the shaft in the space between the bushing and sleeve and be forced into one end of the groove. When the shaft revolves in the direction shown by the arrow in Fig. 3 the oil will enter the end $12^c$ of the groove while when the shaft revolves in the opposite direction the oil enters at $12^a$.

By this construction, a very effective arrangement is provided for oiling the bearing of the driven member from the bearing housing of the member which drives it, thus obviating the necessity of providing separate oiling means for the driven member for lubricating purposes during its idle movements.

Having thus described my invention, I claim:

1. In a lubricating system, a drive shaft, a stationary bearing housing for said drive shaft having an oil reservoir, a driven member mounted upon said shaft with one end thereof projecting into said housing, there being an oil space at the extreme end of said member, means for carrying lubricant to said space from said reservoir, said driven member having an oil groove in its inner wall extending in the general direction of its length with both ends of the groove opening into said oil space.

2. In a lubricating system, a drive shaft, a bearing sleeve for said shaft, a stationary housing for said sleeve having an oil reservoir, said shaft being extended beyond said housing, a member loosely mounted upon said shaft together with means for connecting and disconnecting the same therewith, said member having a bushing with one end of said bushing extending into said housing adjacent the end of said sleeve with space therebetween, means for conveying oil to said space, said bushing having a groove extending from said oil space at an inclination to the axis of rotation thereof to a point near the opposite end thereof and thence backwardly at an opposite angle to said oil space.

3. In a lubricating system, a stationary housing having an oil reservoir, a shaft mounted in said housing, a member rotatably mounted on said shaft adjacent said housing with a portion thereof extending into said housing, said shaft and member being capable of relative rotary movement, there being an oil space adjacent the end of said member in said housing, means for carrying oil from said reservoir to said space, said member having an oil groove in its periphery extending in the general direction of its length with both ends of the groove opening into said oil space.

4. In a lubricating system, a stationary housing having an oil reservoir, a rotary shaft mounted in said housing, a driven member supported on said shaft adjacent said housing with a portion thereof extending into said housing, said shaft and member being capable of relative rotary movement, there being an oil space at the extreme end of said member in said housing, means including the shaft for carrying oil from said reservoir to said space, said driven member having an oil groove in its bore extending in the general direction of its length with both ends of the groove opening into said space.

In testimony whereof, I have hereunto set my hand this 29th day of August, 1927.

EDWIN M. WRIGHT.